Inventor
Erick Pearson
By Carwell & Lagaard
Attorneys

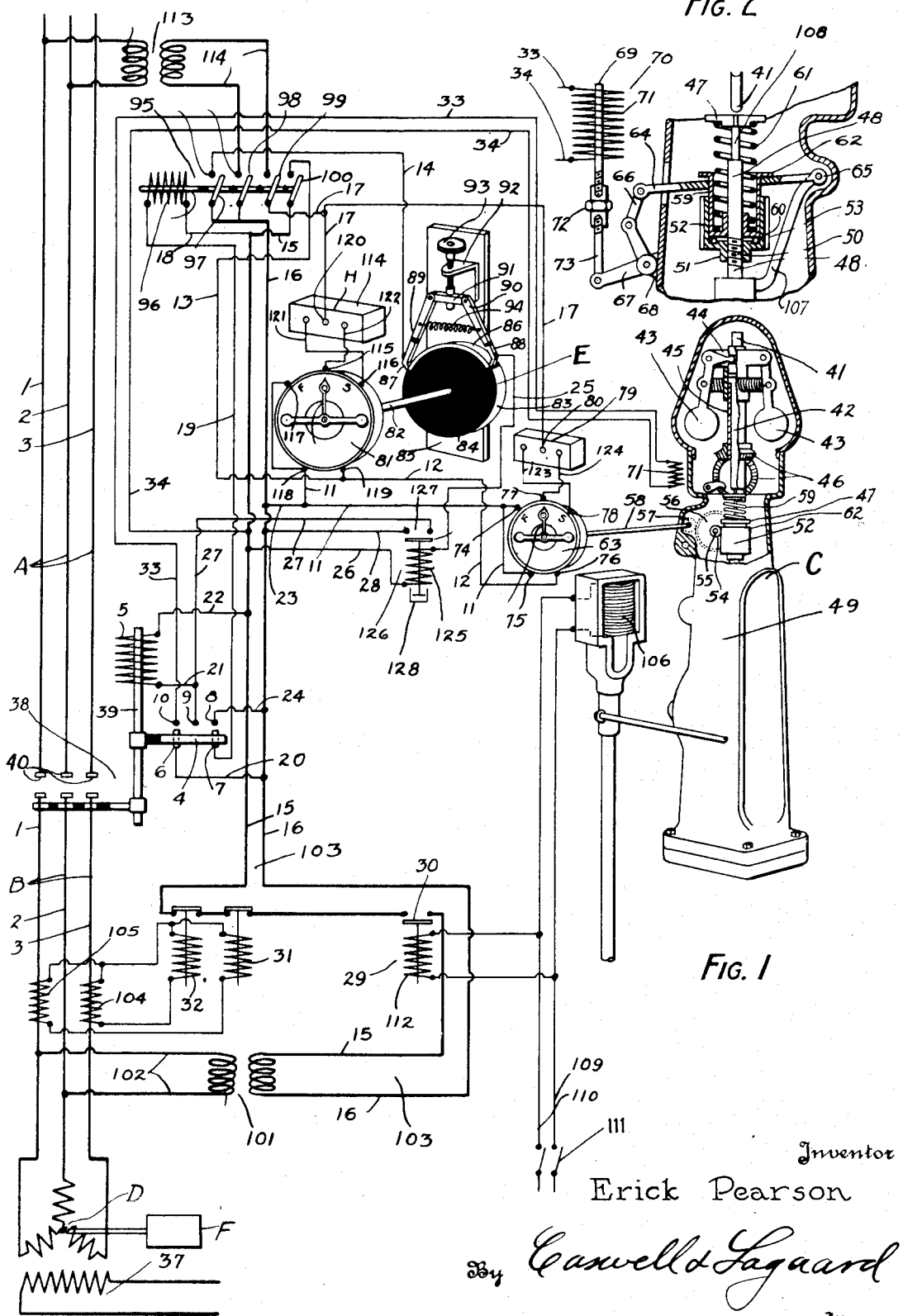

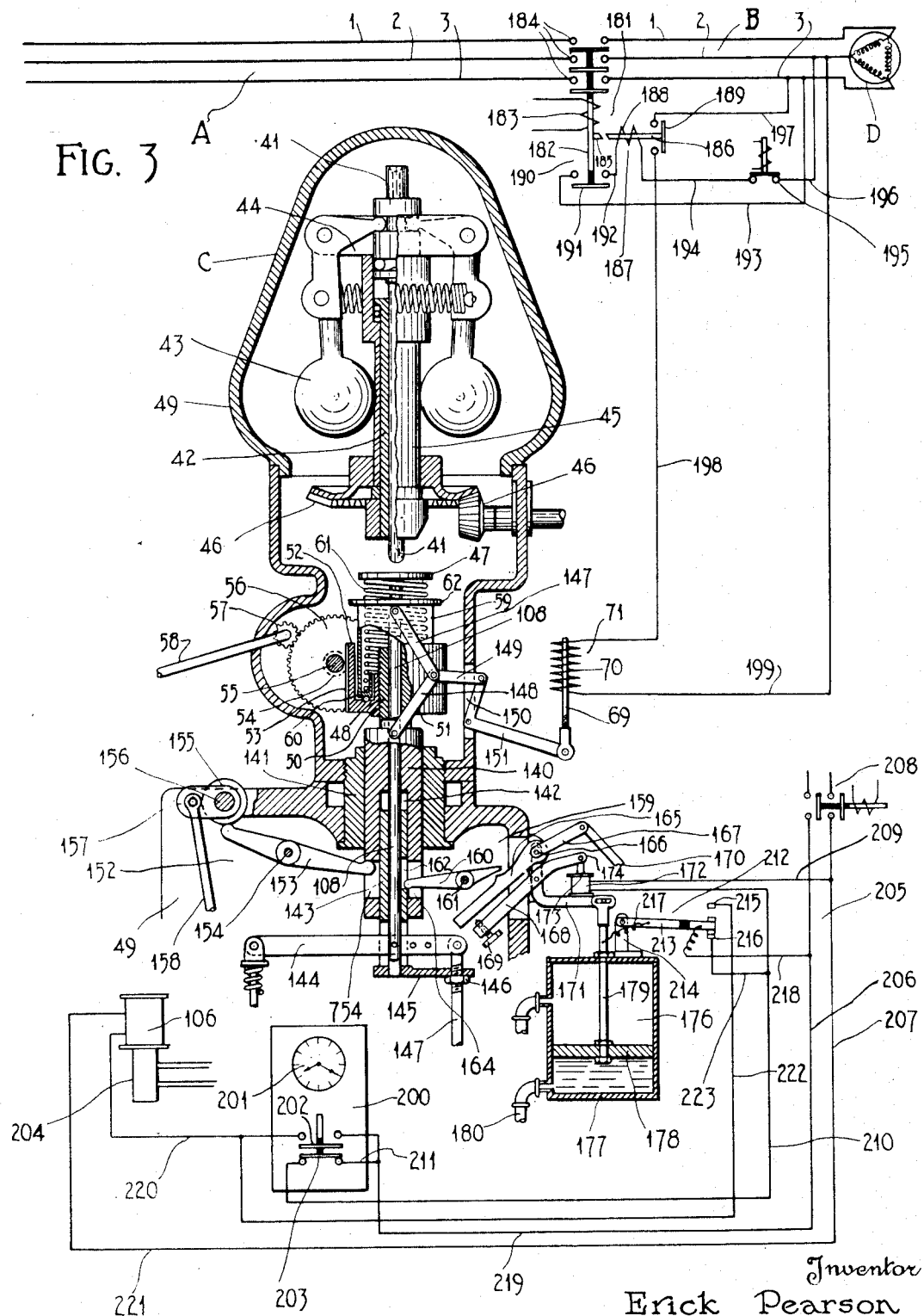

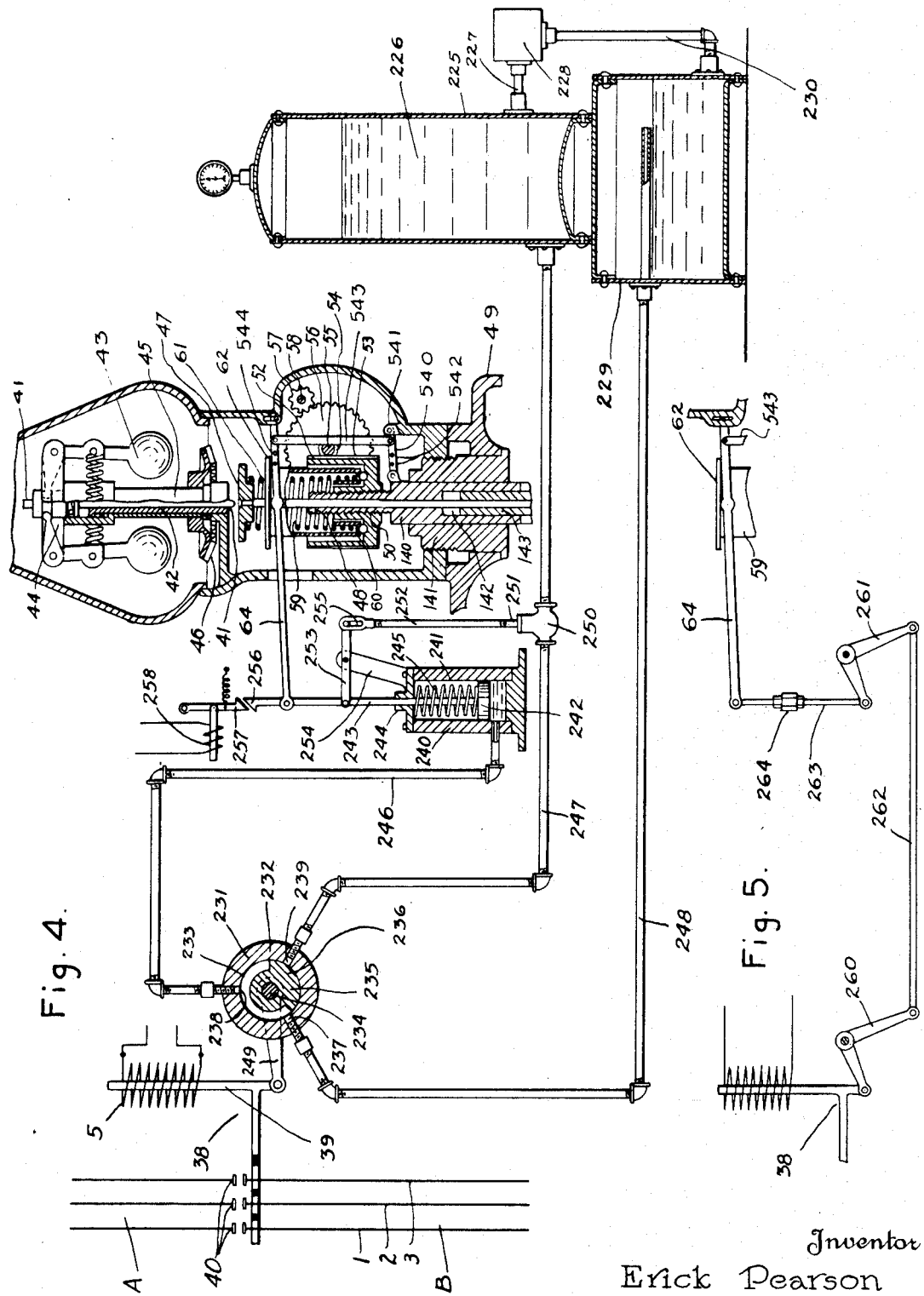

April 13, 1937.  E. PEARSON  2,076,588
SYSTEM FOR LOADING GENERATORS
Original Filed Aug. 19, 1931    7 Sheets-Sheet 5
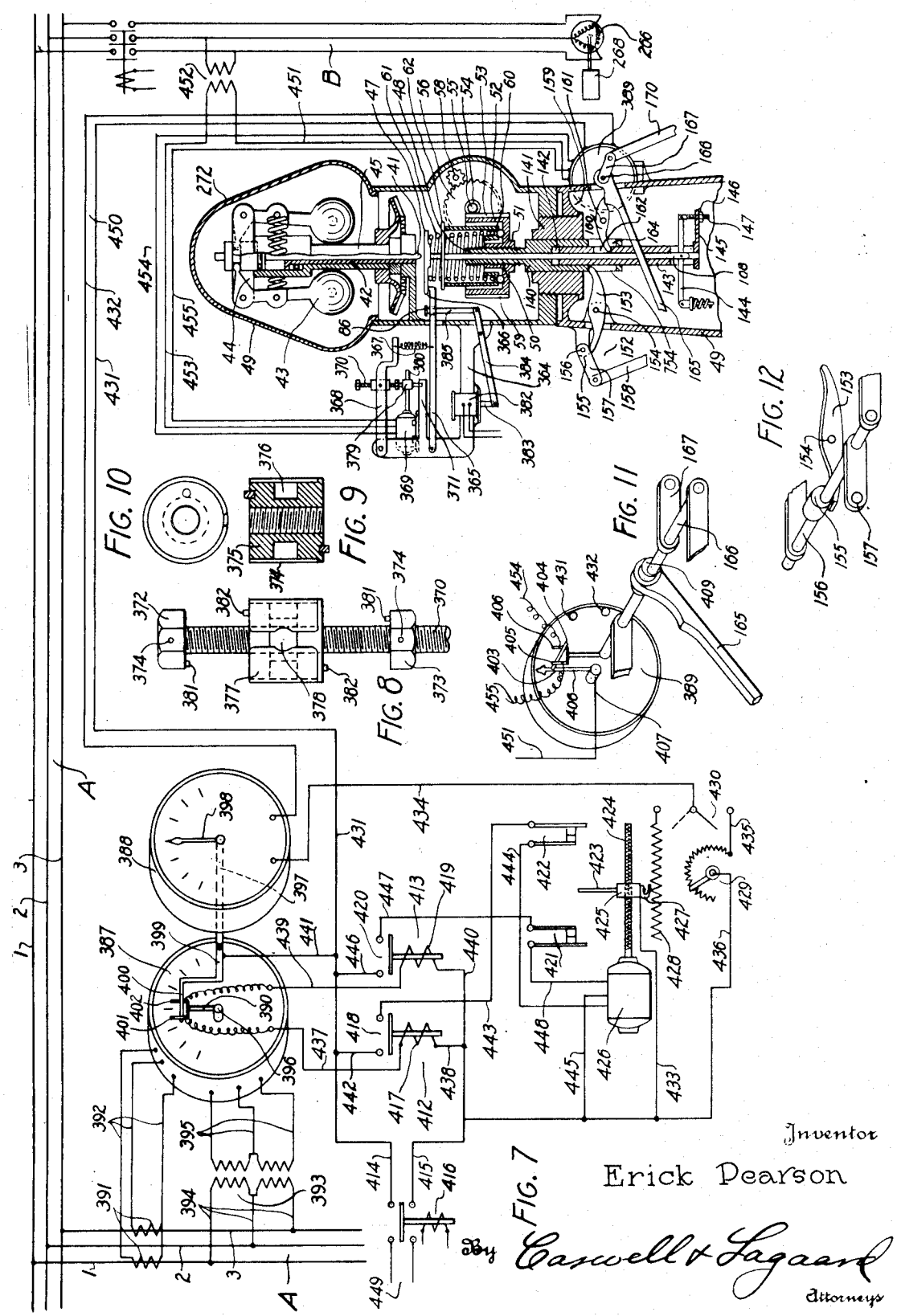

April 13, 1937.
E. PEARSON
2,076,588
SYSTEM FOR LOADING GENERATORS
Original Filed Aug. 19, 1931   7 Sheets-Sheet 6
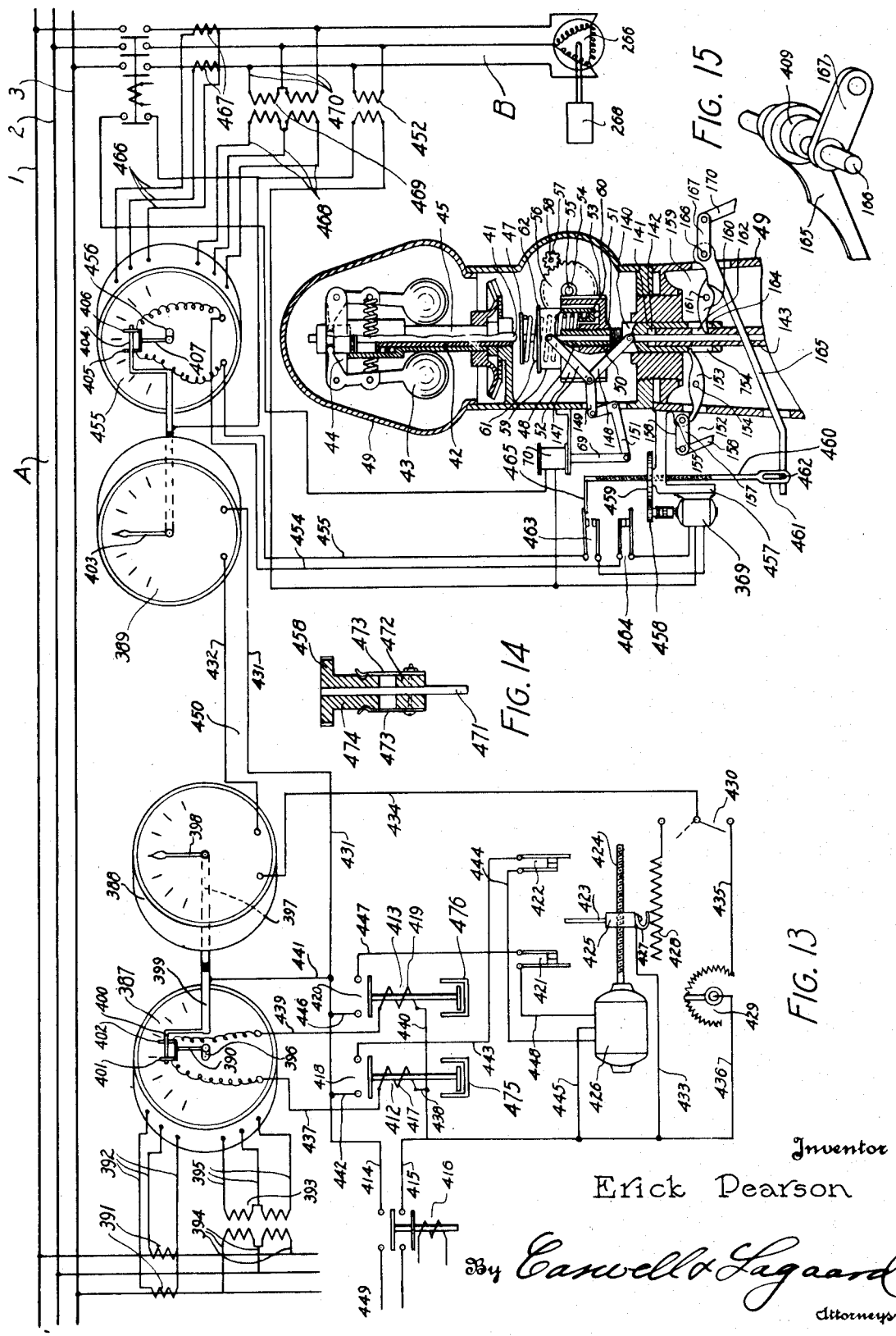
Inventor
Erick Pearson
By Caswell & Lagaard
Attorneys

Inventor
Erick Pearson
By Caswell & Lagaard
Attorneys

Patented Apr. 13, 1937

2,076,588

UNITED STATES PATENT OFFICE 2,076,588

SYSTEM FOR LOADING GENERATORS

Erick Pearson, Chicago, Ill.

Application August 19, 1931, Serial No. 558,024
Renewed November 16, 1934

18 Claims. (Cl. 290—40)

My invention relates to systems for loading generators and has for its object to provide a system in which a generator may be automatically loaded.

An object of the invention resides in providing a system in which the loading of the generator is accomplished through the adjustment of the governor for the prime mover thereof.

Another object of the invention resides in providing a system in which the generator is caused to take on load after the same has been synchronized with and connected to a distribution system.

A still further object of the invention resides in providing a system in which the speed control member of the governor is adjusted to cause the generator to change the load taken by the generator.

An object of the invention resides in providing a device for bringing the generator up to synchronous speed, said device also operating upon the speed control member of the governor.

Another object of the invention resides in providing a system in which the two devices are independently operable so as to not interfere with one another.

Another object of the invention resides in providing a system in which the device for bringing the generator up to synchronous speed remains at its synchronous position when the load pickup device is operated.

A still further object of the invention resides in providing two members engaging the speed control spring of the governor, one of said members being free from the other to move independently thereof and in utilizing the free member for causing the generator to pick up load and the other member for bringing the generator into synchronous speed.

Another object of the invention resides in providing an adjusting member operable between fixed limits for engaging the speed control spring to vary the resiliency thereof and also a gradually adjustable adjusting member for further varying the resiliency of the speed control spring, said gradually adjustable member being utilized for bringing the generator into synchronous speed and said other named adjusting member being utilized to cause the generator to take on load.

Another object of the invention resides in providing a solenoid for causing the generator to take on load, said solenoid being rendered operable upon the connection of the generator to the system.

A still further object of the invention resides in providing fluid operated means for adjusting the speed control member of the governor to cause the generator to take on load when the generator is connected to the distribution system.

Another object of the invention resides in providing linkage for operating the speed control member of the governor when the generator is connected to the distribution system.

An object of the invention resides in providing a system having two sources of supply of electrical energy, and in further providing means in the system for causing one of the sources to deliver power in accordance with the power delivered by the other source.

Another object of the invention resides in providing a system including a generator and a prime mover together with a source of fluid for operating the prime mover and in further providing a loading device for changing the amount of energy delivered by said generator in accordance with the amount of fluid available for the operation of said prime mover.

An object of the invention resides in providing a loading device adapted to control the operation of the generator governor and in further providing means responsive to load conditions of the distribution system for operating said loading device.

Another object of the invention resides in providing a movable stop for engagement with the speed control member of the governor, in providing means for holding the stop from movement and in providing releasing means for releasing said holding means.

Another object of the invention resides in providing in conjunction with the control means of the governor, means for periodically operating the control means.

A still further object of the invention resides in providing means responsive to one value of power delivered by the system for operating said control means and means responsive to another value of power delivered by the system for rendering the control means inoperable.

A feature of the invention resides in providing a gradually adjustable load control device and gradually operable means responsive to the amount of power delivered by the system for adjusting said load control device to cause the generator to assume a load proportional to the power delivered by the system.

Another object of the invention resides in providing means responsive to the power delivered by the system for limiting the actuation of the load control device.

A still further object of the invention resides in providing a power responsive member and a current responsive member operable to control the current of another current responsive member to cause the gradual adjustment of the load control device.

Other objects of the invention reside in the novel combination and arrangement of parts and in the details of construction hereinafter illustrated and/or described.

In the drawings:

Fig. 1 is a wiring diagram illustrating an embodiment of my invention.

Fig. 2 is a fragmentary longitudinal sectional view of a portion of the governor illustrating the loading device of the invention.

Fig. 3 is a wiring diagram showing a modification of the invention illustrated in Fig. 1.

Fig. 4 is an elevational sectional view of a modification of the device for operating the loading device of the invention.

Fig. 5 is a modification of the invention shown in Fig. 4.

Fig. 7 is a wiring diagram of a system similar to that shown in Fig. 6 in which the gate of the prime mover of one generator is proportional to the amount of power delivered by another source of electrical energy.

Fig. 8 is an enlarged fragmentary elevational view of the clutch mechanism used with the invention shown in Fig. 7.

Fig. 9 is a sectional view of a portion of the structure shown in Fig. 8.

Fig. 10 is an end view of the structure shown in Fig. 9.

Fig. 11 is a diagrammatic perspective view of the limiting mechanism of the invention detached from the governor.

Fig. 12 is a view similar to Fig. 11 of the compensating mechanism of the invention detached from the governor.

Fig. 13 is a wiring diagram similar to Fig. 7 illustrating a system in which a loading of the generator is procured proportional to the power delivered by the distribution system.

Fig. 14 is a sectional detail view of the motor clutch mechanism of the invention shown in Fig. 13.

Fig. 15 is a perspective detail view of the limiting mechanism of the invention detached from the governor.

Fig. 18 is a vertical sectional view of another valve of the section.

Figure 6:
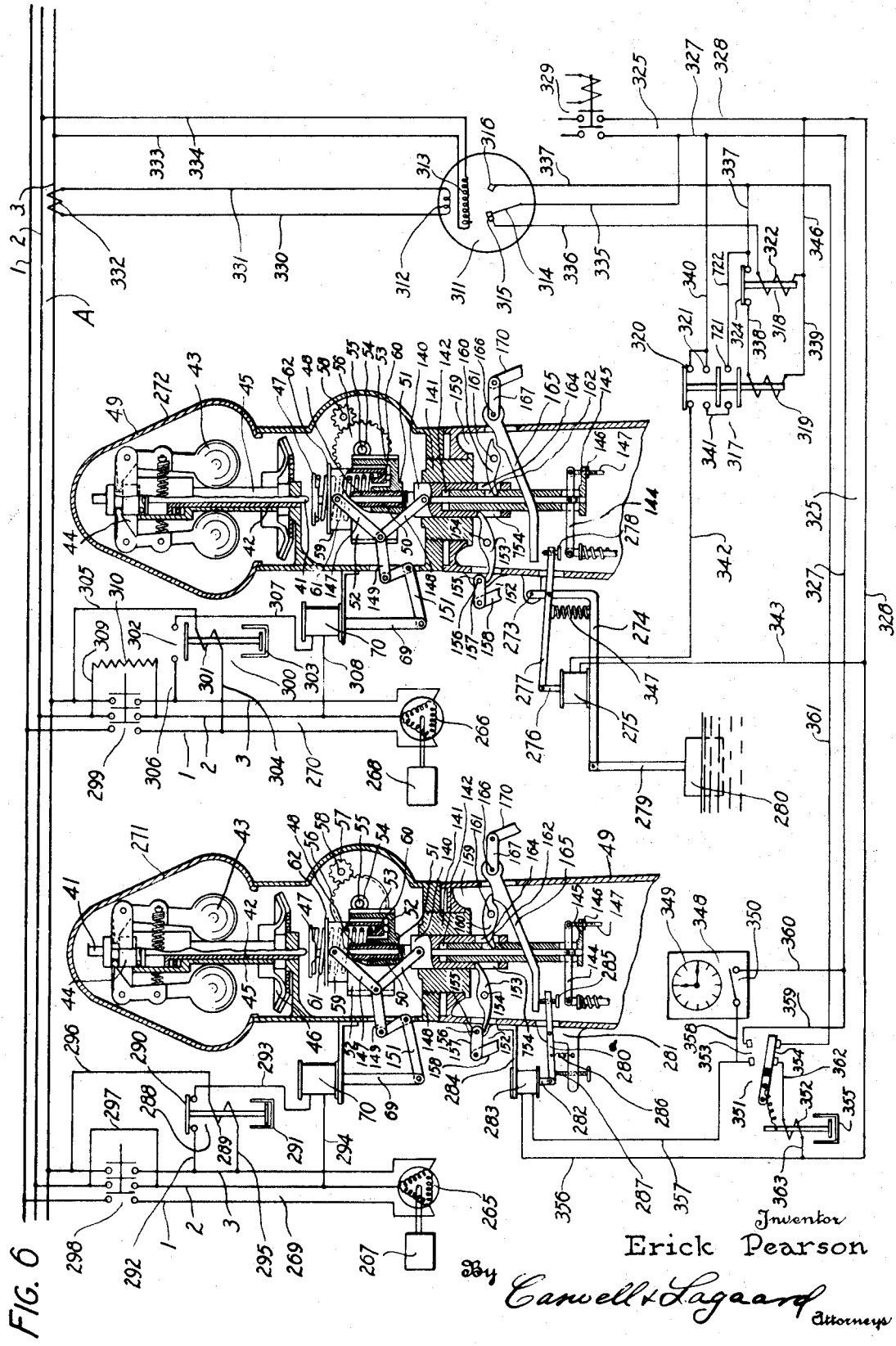
Fig. 6 is a wiring diagram of a system in which loading is procured in accordance with the power delivered by another source of energy supply.

This application is a continuation in part of my application for patent, Serial No. 695,153, filed February 26, 1924 for Automatic synchronizers, now Patent No. 1,820,319, of which application a division Serial No. 480,333 has been filed September 8, 1930 (now United States Letters Patent No. 2,020,326), said patents claiming certain features of the disclosures common to them and to this application. Said Patent 2,020,326 broadly claims the use of speed regulating devices in which a first means is employed for obtaining a matching speed, and the superseding of this first means when the plant comes under load, whereby said first means may maintain its adjustment during the general operating period of the plant and thus be ready to establish a new speed matching quickly at the next starting period. The present application claims broadly certain features of metering, load proportioning and plant control upon a proportioning basis; and specifically a type of speed regulation in which the plant is brought to matching speed by first means which are then superseded by means responsive to the load demand of the associated system.

For the purpose of illustrating my invention, I have shown a distribution line A having phases 1, 2 and 3 and a generator line B having phases 1, 2 and 3. The generator line B is connected to a generator D provided with a field coil 37 which may be excited in any well known manner. This generator may be driven through a prime mover F of any well known construction such as a water wheel, internal combustion engine or steam turbine. In the drawings it has been assumed that the prime mover F is a water wheel.

A circuit breaker 38 is employed for connecting the generator line B to the distribution system A. This circuit breaker comprises an operating member 39 adapted to be actuated through a solenoid 5. The operating member 39 is adapted to close three switches 40, which connect the generator line to the distribution system. In addition, the operating member 39 operates a contact bar 4 which is adapted to engage three fixed contacts 8, 9 and 10 and to connect these three contacts together. The contact bar 4 is further adapted to engage two other contacts 6 and 7 when moved in the opposite direction, which contacts are elongated so as to maintain the circuits therethrough closed until the circuit breaker is substantially closed.

For the purpose of controlling the operating of the generator D, a governor C is employed which is adapted to regulate the amount of water delivered to the prime mover F. The governor C may be of any suitable construction and a governor of the flyball type has been illustrated. This governor comprises a rotatable spindle 41 adapted to be reciprocated along a guide 42 by means of the usual flyballs 43. These flyballs are pivotally connected to a yoke 44 mounted on a sleeve 45, which sleeve 45 is driven through gearing 46 from any suitable source of power such as a motor operated from the generator or a direct mechanical drive from the generator or prime mover. The spindle 41 is adapted to engage a cap 47 secured to the speeder rod 108 of the governor which constitutes the control member of the governor. The rod 108 is slidably mounted in a tubular guide or sleeve 48 which is connected to the compensating mechanism of the governor and is adapted to be moved through movement of the gate or other structure controlled by the governor. The sleeve 48 is threaded as indicated at 50 to receive a nut 51 having a cup 52 thereon formed with worm teeth 53 upon the outer periphery thereof. The teeth 53 are adapted to mesh with a worm 54 fast on a shaft 55 journalled in the frame 49. The shaft 55 has attached to it a spur gear 56 which meshes with a spur pinion 57 secured to another shaft 58. This shaft is operated by the speed matching device of the invention as will be presently described in detail. Within the cup 52 is slidably mounted a cylinder 59 which is formed at its inner end with an inwardly extending shoulder 60 adapted to form a seat for a compression coil spring 61 encircling the sleeve 48. The spring 61 is further seated at its other end against the cap 47. The seat 60 is adapted to engage the inner end of the nut 51 and may be raised and lowered through a flange 62 formed on the other end thereof.

For raising and lowering the sleeve 59, a lever 64 is employed which is pivoted as indicated at 65 to a bracket 107 attached to the sleeve 48 of the governor proper. This lever has pivoted to it, a link 66 which in turn is pivoted to a bell crank 67. The bell crank is mounted for oscillation in a bracket 68 formed on the case 49 of the governor and is adapted to be operated through the plunger 69 of a solenoid 70. The solenoid 70 includes a coil 71 connected in a manner to be presently described in detail. The plunger 69 of the solenoid 70 is connected through an adjustable coupling 72 with an operating rod 73 which is pivoted to the bell crank 67. Through this adjustable coupling, the movement of the sleeve 59 may be accurately determined.

For operating the shaft 58, a number of different devices may be employed, though I have found that a motor similar to an ordinary synchroscope, which I have indicated at 63 may be advantageously employed. Such construction being similar to that disclosed in my copending application for patent, Serial No. 480,333, filed September 8, 1930, will not be described in detail. This motor is provided with common terminals 74 and 75 which are connected together and with a terminal 76 for connection to one source of energy supply. The motor 63 is further provided with terminals 77 and 78 which are connected through leads 123 and 124 to a resistance and a reactance indicated at 79, which have a common terminal 80. This motor operates at a speed depending upon the difference in frequency of the voltages of the generator and distribution system and in a direction depending upon which of the frequencies thereof is the greater. This motor serves to rotate the shaft 58 and to adjust the position of the nut 51 to vary the spring tension and to cause the governor to control the speed of the generator and to match the frequency of the generator with that of the distribution system.

In conjunction with the device for adjusting the speed setting mechanism of the governor, I employ an ordinary synchronizing device which I have indicated in its entirety at E. This device may be constructed in any suitable manner as for example as disclosed in my copending application above referred to. This synchronizing device includes a synchroscope 81 which is provided with a shaft 82, and which is connected with a controlling device indicated in its entirety at 83. The synchroscope 81 further includes a resistance and a reactance indicated at 114 which are connected to two of the terminals 115 and 116 of said synchroscope through leads 121 and 122. Two other terminals 117 and 118 are the common terminals of the synchroscope. A terminal 119 of the synchroscope is connected to the generator line while the common terminal 120 thereof is connected to the resistance and reactance 114 and to the distribution line.

The controlling device 83 comprises a rotating member 84 rotatably mounted upon a base 85 and driven through the shaft 82. This member is constructed with a segmental contact strip 86 which is adapted to be engaged with the free ends 87 and 88 of the two contact arms 89 and 90. The ends 87 and 88 are insulated from the arms 89 and 90 as designated diagrammatically in the drawings. The contact arms 88 and 89 are pivoted to a bar 91 which is connected to a bar 92 attached to base 85. The bar 91 may be moved along said bracket through an adjusting screw 93 whereby the arc of the segment 86, spanned by contact bars 87 and 88 may be varied at will. The arms 89 and 90 are normally held together through a tension coil spring 94. As the member 84 rotates, a circuit is established through the contacts 87 and 88, the duration of which depends upon the position of said arms and the rapidity of the rotation of the shaft 82 of the synchroscope 81.

In conjunction with the circuit breaker 38, a magnetically operated circuit closer 95 is employed which is adapted to be closed through a solenoid 96. This circuit closer includes four switches 97, 98, 99 and 100 which are adapted to be simultaneously closed upon operation of the coil 96 of said circuit closer.

For the purpose of providing electrical current for operating the switch 95, and likewise circuit breaker 38, a transformer 101 is employed which has its primary connected through leads 102 with the phases 1 and 2 of the generator line B. The secondary of this transformer is connected to a control line 103 which includes leads 15 and 16 of which the lead 16 is connected to switches 97 and 98 of circuit closer 95 and of which the lead 15 is connected to the switch 30 of relay 29. In the circuit 103 is disposed overload relays 31 and 32 which are connected through suitable current transformers 104 and 105 to the generator line B. These relays normally retain the circuit through the line 103 closed, but an overload opens said circuit in the usual manner. The actuation of these devices being well understood and not constituting an important part of the invention, have but been briefly described.

In order to start the system in operation, I employ a solenoid 106 which is adapted to open a valve which subjects the mechanism of the governor to the fluid under pressure, utilized for operating the same. Upon operation of the governor, the valve or gate controlling the flow of water to the water wheel is opened, setting the prime mover F into operation. This construction being well known in the art and forming no particular part of this invention has not been described in detail. For operating solenoid 106, I employ a circuit 109—110, which is provided with a starting switch 111, and which may be energized from any suitable source of electric current. The switch 111 may be disposed remotely from the plant to permit of operating the system by remote control or the same may be conveniently located in the power plant. The switch 111 is maintained closed as long as the generator to be cut in is desired to operate and, upon opening switch 111, the entire mechanism is cut out and the supply of water to the turbine shut off. In the circuit 103 is connected the normally open switch 30 of a relay 29, whose coil 112 is adapted to be energized from the circuit 109—110 when the switch 111 is closed. This relay closes the circuit through line 103 and brings current up to the circuit closer 95.

The synchronizer E is energized as follows: The primary of a transformer 113 is connected to phases 1 and 2 of the distribution line A. The secondary of this transformer is connected through conductors 114 with the two switches 98 and 99 of circuit closer 95 so that when said circuit closer is closed, one conductor of each of the transformers 113 and 101 are connected together. The common connection 120 of the resistance and reactance indicated at 114 is connected to a common lead 17 which in turn is connected to switch 99 and also to the common terminal 80 of the resistance and reactance 79. The connection 119 of the synchroscope 81 is connected to a conductor 13 which is further connected to switch 100 of the circuit closer 95. The common terminals 117 and 118 of the synchroscope 81 are connected through two conductors 11 and 23 with the lead 16 of the control line 103. Upon closing said circuit closer 95 current flows from the transformer 113 through the two switches 98 and 99 to the synchroscope 81. At the same time, current flows from the control line 103 through switch 100 to the synchroscope. This connects the synchroscope up to both the distribution system and the generator line causing the synchroscope to operate in the usual manner.

The motor 63 is connected to the generator line and to the distribution line in exactly the same manner as the synchroscope 81. The common terminal of the reactance and resistance 79, as stated, is connected to the conductor 17. The common terminals 74 and 75 of motor 63 are connected together and to the conductor 11 previously referred to. The terminal 76 of this motor is connected through a conductor 12 with the conductor 13 leading from the corresponding terminal of the synchroscope 81. In this manner, the motor 63 operates in identically the same manner as the synchroscope 81. When the generator is out of phase with the distribution line, both shafts 82 and 58 rotate. Rotation of shaft 58 causes a rotation of cup 60 which varies the tension on the spring 61 causing the governor to change the speed of the generator and matching the frequencies of the generator with that of the distribution line. At the same time, rotation of the shaft 82 causes a timing of the controlling device 83, which operates to close the circuit breaker as will now be described.

The coil 96 of circuit closer 95 is connected through a conductor 18 with the lead 15 of line 103 and through another conductor 19 with the contact 7. Before the circuit breaker 38 is closed, a circuit is established through this coil from the transformer 101, which energizes said circuit closer and closes all of the switches 97, 98, 99 and 100. This connects the synchronizing and speed matching elements of the system to their respective sources of power and causes them to function in their intended manner. As soon as the circuit breaker 38 is closed, the circuit through the coil 96 is opened through contact 7 and contact bar 4, which disconnects all of this apparatus from the system.

The contact 87 of the controlling device 83 is connected through a conductor 14 with switch 97. The corresponding contact 88 is connected through a conductor 25 with the coil 125 of a timed relay 126. This relay is further provided with a switch 127 and a dash-pot 128 by means of which the closing of the switch is retarded. The coil 125 of this relay is further connected through a conductor 26 with the lead 15 of line 103. Switch 127 is connected through two conductors 27 and 28 with contact 9 of circuit breaker 38 and with the lead 16 of line 103. Conductor 27 in turn is connected through a conductor 21 with the coil 5 of circuit breaker 38, which is further connected through the conductor 22 with the side 15 of line 103. When the shaft 82 travels slow enough, and when the segment 86 is in the proper position with respect to the contacts 87 and 88, relay 126 is operated which closes switch 127. This energizes coil 5 of circuit breaker 38 closing the same and connecting the generator line B to the distribution system line A.

To cause the generator to take on load, a circuit comprising leads 33 and 34 is employed of which the lead 34 is connected to the lead 15 of which the lead 33 is connected to the contact 10 of the circuit breaker 38. Contact 6 of this circuit breaker is connected through a conductor 20, while contact 8 is similarly connected through a conductor 24 with the same lead 16. The leads 33 and 34 are directly connected to the coil 71 of solenoid 70, which is adapted to operate the toggle-linkage comprising the link 66 and the bell crank 67. When the circuit breaker closes, the contact bar 4 connects contacts 8 and 10 together which completes the circuit through leads 33 and 34, energizing coil 71 and actuating the load pick-up device. This raises lever 64, increasing the tension on spring 61 and causing the generator to take on load. By means of this construction, the generator is caused to automatically take on load as soon as the circuit breaker is closed. Through the adjustment of coupling 72, any predetermined amount of load can be procured so as to give the desired results. It will be noted that the cylinder 59 operates independently of the cup 52. This does not disturb the setting of the cup 52 which remains as it was when the system was last synchronized. When the system is again to be synchronized, this member is at a position very close to synchronous position so that practically no further adjustment of the same is required. It hence becomes obvious that with the member 52 so disposed, that a relatively small amount of adjustment is required before the system can be synchronized thereby greatly decreasing the time necessary to synchronize the generator with the system.

In Figure 3 a modification of the invention has been shown. In this figure only a portion of the governor C is illustrated. However, in this figure the construction of the governor has been disclosed in further detail than in Fig. 1.

The sleeve 48 in this form of the invention, which is enlarged at its lower end as indicated at 140, is slidably supported in a guide 141 attached to the frame 49 of the governor. Portion 140 of the sleeve is formed at its lower end with a bore 142 in which is slidably mounted another sleeve 143. The speeder rod 108 slides through the sleeve 140 and also through the sleeve 143, and is connected to a lever 144 by means of which the flow of fluid to the valves controlling the opening and closing of the gate is procured. The sleeve 143 is connected to a bracket 145 which is adapted to engage a nut 146 on the rod 147, which limits the movement of the sleeve 140 and the consequential opening of the gate controlled by the governor.

In the form of the invention shown in Fig. 3, the toggle linkage for moving the cylinder 59 is slightly different. In Fig. 3 two links 147 and 148 are employed, which are pivoted to the cylinder 59 and to the enlarged portion 140 of sleeve 48. These two links are pivotally connected together and are further connected to a link 149 which projects outwardly through an opening 150 in the frame 49 of the governor proper. A bell crank 151 pivoted to the frame 49 of the governor C is pivotally connected to the link 149 and to the plunger 69 of solenoid 70 as in the other form of the invention.

The governor C is further provided with a compensating mechanism indicated in its entirety at 152. This mechanism comprises a lever 153 pivoted at 154 to the governor frame 49. The lever 153 operates in a slot 754 in the sleeve portion 140. The other end of the lever 153 engages an eccentric cam 155 which is secured to a shaft 156 journaled in the frame 149. This shaft has attached to it a short lever 157 which is adapted to be swung from a rod 158. Rod 158 is connected to a member movable in proportion to the gate opening, and has a movement proportioned to the movement of the piston operating to open and close the gate. The operation and function of the compensating device 152 being well known and understood in the art, will not be described in detail.

The governor C further includes a limit device which I have indicated in its entirety at 159. This device comprises a lever 160 which is pivoted to the governor frame 49 at 161. One end of lever 160 extends into a slot 162 in sleeve 143 and passes freely through an opening 164 in the portion 140 of sleeve 48. Operating in conjunction with the lever 160 is another lever 165 which serves as a stop for limiting the movement of said lever 160. The lever 165 is pivoted on an eccentric shaft 166, which has attached to it an arm 167. Lever 165 is further supported through an operating control lever 168 which is also pivoted to the frame 49 of the governor. The lever 168 is provided with an adjusting screw 169 whereby adjustment of lever 165 with reference thereto may be had. The link 167 is connected to an operating rod 170 which is connected and operated similarly to the rod 158. In addition to the lever 168, a swinging arm 171 is employed which carries a solenoid 172. This solenoid is provided with a plunger 173 which is pivotally connected to an arm 174 formed on the lever 168. When the solenoid 172 is energized, plunger 173 is brought into the same and the two arms 171 and 174 caused to move together. This swings lever 168 in such a manner as to engage lever 165 with lever 160, to limit the fluid imparted to the prime mover in accordance with the fluid available.

The arm 171 is adapted to be controlled through a float mechanism indicated in its entirety at 176. This mechanism comprises a receptacle 177 having a float 178 therein, which is connected through a float rod 179 with the end of arm 171. The receptacle 177 is in communication through a conduit 180 with the source of fluid supply for operating the prime mover for the generator. When the prime mover is a waterwheel or turbine, the receptacle 177 is situated at a suitable elevation corresponding with the elevation of the water in the mill pond and the float 178 is caused to rise and fall in accordance with the usual rise and fall of the water in the mill pond. When the power used is steam, the steam may be introduced through the conduit 80 and suitable resilient means provided to resist the movement of 178 which, in such case, becomes a piston operable in the receptacle 177. Operating in conjunction with the float 178 is an over center switch indicated in its entirety at 212. This switch comprises an arm 213 pivoted to a bracket 214 carried by the receptacle 177. The arm 213 is adapted to make contact with either of the two contacts 215 or 216. A spring 217 is connected to the arm 213 intermediate its length and also to the float rod 179. As the portion of rod 179 connected to this spring passes the pivot of the arm 213, said arm is swung to alternately make contact with the two contacts 215 or 216.

In Fig. 3 the generator line is indicated at B and the distribution line at A, the same as in the form of invention shown in Fig. 1, the phases thereof being designated by numerals 1, 2 and 3. The circuit breaker in this case, however, is somewhat different and is indicated in its entirety at 190. This circuit breaker comprises a plunger 182 which is slidably disposed within a coil 183 corresponding to the coil 5 of the device shown in Fig. 1 and connected to the system in much the same manner. The plunger 183 operates the switches 184 which connect the generator line and distribution line together. The circuit breaker 190 is provided with a normally open maintaining-circuit switch 191, adapted to be operated by the plunger 182. Upon the plunger 182 is mounted a latch 185, which is adapted to be engaged by a latch rod 186 forming the plunger of a latch magnet 187. The latch magnet 187 further includes a coil 188 and a normally opened switch 189, adapted to be operated by plunger 186. The switch 191 is connected through a conductor 192 with the coil 188 of latch magnet 187. This switch is further connected through a conductor 193 with phase 3 of the generator line A. The other side of the coil 188 is connected through a conductor 194 with a switch 195 which in turn is connected through a conductor 196 with phase 2 of the generator line B. Switch 189 is connected through a conductor 197 with phase 3 of the generator line B, and is further connected through conductor 198 with coil 70, previously referred to. This coil is connected through a conductor 199 with phase 2 of the generator line A.

When the circuit breaker is closed through energization of the coil 183 thereof, as described in conjunction with the invention as shown in Fig. 1, plunger 182 is so manipulated as to close switch 191. At the same time, the latch lug 185 passes above the bar 186. Closure of switch 191 energizes the circuit through the coil 188 of latch magnet 187 which draws the plunger 186 thereof in a position to engage the latch lug 185. This holds the circuit breaker closed until the circuit through the latch magnet 188 is normally opened, through switch 195, which switch has much the same function as the switch 111 in the other form of the invention. Operation of the latch magnet 187 closes switch 189 which energizes coil 70. This draws the plunger 69 thereof into coil 70 and swings bell crank 151 in a manner to cause the links 147 and 148 to substantially straighten out, moving the cylinder 58 upwardly and increasing the tension on the spring 61, so as to cause the governor to change the gate setting and cause the generator to take on load.

In the operation of the power plant, it becomes desirable to connect the generator to the system when certain conditions arise. First of all, where a limited supply of water is available for the operation of the turbine, it becomes highly desirable to utilize the water only during certain periods when the power is most desired. For this purpose the float mechanism, indicated at 176, and a time controlled switch 200 are employed. This switch comprises a clock or other suitable time controlled mechanism, indicated at 201, such as is now well known in the art, and which is adapted to simultaneously move two switches 202 and 203 at any predetermined time, for which the mechanism 201 may be set. The starting solenoid 106 is the same as indicated in Fig. 1, and is operated to admit the flow of fluid to the governor, through a valve mechanism 204 the same as in Fig. 1. For actuating the governor, a control line 205 is employed, which comprises leads 206 and 207, adapted to be energized from any suitable source of electrical energy. These leads have connected in them a switch 208 by means of which the control circuit 205 may be connected to the source of electrical energy. The magnet 172, previously referred to, is connected to the lead 207 through a conductor 209 and is further connected through a conductor 210 with the switch 203. This switch is connected through a conductor 211, with another conductor 219 which, in turn, is connected with lead 206 and with control line 205. The arm 213 and the switch 212 is connected through a conductor 218 with lead 206 of line 205. The other switch 202 of the switch mechanism 200 is connected through a conductor 219 with the lead 206 of control line 205. The other side of this switch is connected through a conductor 220 with the solenoid 106, which is further connected through a conductor 221 with the other lead 207 of line 205. The other contact 215 of the over center switch 212 is connected through a conductor 222 with the conductor 220 previously referred to.

When the switch 208 is first closed, current may flow through solenoid 106 providing switch 212 is connected with the contacts 215, or provided switch 202 is closed. It will be noted that switch 202 and the switch formed through contact 215 and the arm 213 are in parallel, and that either of these switches may close the circuit through the solenoid 106. Upon closure of this circuit, the governor is actuated and the generator started. The contact 216 of the over center switch 212 is connected through a conductor 223 with the conductor 210 as previously referred to.

When the water in the mill pond is low, arm 213 is connected to contact 216, and a circuit completed through solenoid 172, which draws the arm 168 in a position shown in Fig. 3, bringing the contacts 169 in engagement with lever 165, and limiting the operation of the governor to cause the generator to assume a predetermined load. Switch 203 is in parallel with the switch formed at contact 216, and is a normally closed switch, which also maintains the circuit through the solenoid 172 closed. If at a suitable time, determined by the clock 201, the elevation of the water in the mill pond is sufficient to move arm 213 upwardly so as to break the contact with contact 216, the switch 203 will then be open, and the circuit through solenoid 172 opened through both of these switches. Arm 168 then drops and brings the screw 169 out of engagement with lever 165, permitting the governor to control the load taken by the generator at a predetermined time of day.

Instead of operating the load pickup device electrically as illustrated in Figs. 1 and 3, the same results may be accomplished through a suitable fluid under pressure as for example, air, or some suitable liquid. Such a system is illustrated in Fig. 4. In this figure, the governor construction is substantially the same as shown in Figs. 1 and 3 with the exception that the linkage 66—67 is omitted and the lever 64 directly operated through the fluid control apparatus, and with the further exception that an adjustment may be had for controlling the movement of said lever 64 and the consequential loading of the generator. In this case, the bracket 107 is dispensed with and an arm 540, which is pivoted to the sleeve 140 of the governor previously described, is used. This arm is further pivoted to the frame 49 of the governor at 541 and is provided with a plurality of adjusting holes 542. Instead of bracket 107, a link 543 is employed which may be pivoted to the arm 540 in any of the holes 542. This link is further adapted to be pivoted in any of a number of holes 544 formed in lever 64. By selecting the proper holes in which to pivot link 543 to both the lever 64 and lever 540, a more accurate adjustment of the governor can be had so that the loading of the generator can be made more sensitive to the frequency change of the system. For the purpose of illustration, the system shown in Fig. 4 has been described as operated through a suitable liquid under pressure as for example, oil, or some similar liquid. In this form of the invention, a pressure tank 225 is employed which contains a suitable liquid designated at 226. This pressure tank is used in conjunction with a sump 229 which serves as a suitable reservoir for the oil used in this system. An outlet pipe 230 connected with this sump is connected to a pump 228 which in turn is connected through an inlet pipe 227 with the tank 225. When the pump 228 is set in operation, which is preferably accomplished automatically, the oil is pumped from the sump or reservoir 229 and into the tank 225 where a suitable pressure is maintained.

The two lines to be connected together are indicated at A and B the same as in the other forms of the invention. The circuit breaker used for connecting them together is designated at 38 and is the same as shown in Fig. 1 and comprises a plunger 39 adapted to be operated by a coil 5. This circuit breaker further includes switches 40 the same as in the other form of the invention. In conjunction with the circuit breaker 38, a rotary valve 231 is employed which comprises a housing 232 formed with a circular bore 233 therein. In this bore is rotatably mounted a shaft 234, which carries a valve head 235 formed with a portion 236 adapted to engage the wall of the bore 233. In the housing 232 are formed three ports 237, 238 and 239 which extend through the wall of the bore 233 and are spaced about the periphery thereof. A cylinder 240 is also used in conjunction with this form of the invention, which is constructed with a bore 241 and in which is slidably mounted a piston 242. This piston has attached to it a piston rod 243 which is guided through a cap 244 attached to the end of the cylinder 240. The piston rod 243 is pivotally connected to the lever 64 and serves to raise and lower this lever as the pressure within the cylinder 240 is increased or decreased. A compression coil spring 245 is disposed within the cylinder 240 and is seated between the cap 244 and the piston 242.

The cylinder 240 is connected through a pipe 246 with the port 238 of valve 231. The port 239 of this valve is connected through a pipe 247 with the tank 225 while the other port 237 of this valve is connected through a pipe 248 with the reservoir 229. Shaft 234 has attached to it an arm 249 which is pivoted to the plunger 39 and which is adapted to be oscillated upon operation of the circuit breaker. When the circuit breaker is opened as shown in the drawing, the portion 236 of valve head 235 covers the port 239 and brings the two ports 238 and 237 into communication. This equalizes the pressure between the cylinder 240 and the reservoir 229 permitting the spring 241 to force the piston 242 downwardly and to discharge the surplus oil from said cylinder. When the circuit breaker 38 closes, arm 249 is swung upwardly until the port 237 is covered and the port 239 uncovered. This brings the port 238 into communication with the port 239 which directs the fluid under pressure to the cylinder 240 elevating piston rod 243 and swinging lever 64 to accomplish the same result as when the solenoid 70 in the form of the invention shown in Fig. 1 is operated.

When the generator is in operation, it becomes desirable to cut off the fluid supply to the rotary valve 231. For this purpose, a plunger type valve 250 is employed which is inserted in the pipe 247. This valve has a plunger 251 connected to an operating rod 252. A lever 253 is pivoted to a bracket 254 carried by cap 244 and also to the piston rod 243. This lever is further pivotally connected through a sliding connection 255 with the rod 252. The end of the piston rod 243 has formed on it a hook 256 which is adapted to be engaged by a latch 257 to hold the rod 243 in its uppermost position. This latch is adapted to be unlatched by means of a solenoid 258 which may be operated in any suitable manner.

The operation of the device shown in Fig. 4 is as follows: Normally the valve member 235 is positioned as shown in Fig. 4 and the other parts likewise disposed. When the circuit breaker 38 is actuated, coil 5 draws the plunger 39 upwardly swinging lever 249 and oscillating the valve member 235. This closes port 237 and brings ports 239 and 238 into communication. Fluid under pressure now travels from the tank 225 through the valve 250 and pipe 247 to pipe 246 and into the cylinder 240. This raises piston 242, swinging arm 64 upwardly and changing the tension on the spring 61 to cause the generator to take on load as previously described. At the same time, the hook 256 engages the latch 257 and the piston rod 243 remains in its uppermost position holding the lever 64 in engagement with the flange 62 of the governor proper. The governor then continues to operate and the generator to take on load until the latch 257 is disengaged by the coil 258. At the same time, lever 253 is swung in a clockwise direction, which closes valve 251 and shuts off the pressure on the valve 231. When the latch 257 is disengaged from the hook 256, spring 245 urges the piston 242 downwardly opening valve 250. If the circuit breaker 39 is open, the oil within the cylinder 240 is discharged through pipe 248 and into the reservoir 229. If, on the other hand, the circuit breaker is still closed, pressure is maintained in the cylinder 240 and release of the rod 64 prevented.

The slotted connection 255 between the lever 253 and the rod 252 prevents the closing of valve 250 before hook 256 has been latched by the latch 257. After the said hook has been latched, valve rod 252 may be moved into closing position through its own force or through the force of the spring operating the plunger 251 which would be greatly retarded as compared with the operation of the piston 242 in cylinder 240. This retardation gives ample time to latch the piston rod 243 before the fluid pressure is shut off.

The form of the invention shown in Fig. 5 is a modification of that shown in Fig. 4 in which mechanical means are used to operate the lever 64 instead of pressure controlled means. In this figure, two bell cranks 260 and 261 are employed which are pivoted to suitable supports and which are connected through an operating link 262. The bell crank 260 is operated by the circuit breaker 38 while the bell crank 261 is connected through a link 263 with the lever 64. An adjustment 264 in this link serves to procure the desired movement of the lever 64. The operation of this device is substantially the same as that shown in Fig. 4. When the circuit breaker 38 goes in, the bell cranks 260 and 261 are simultaneously oscillated, raising link 263 and swinging lever 64 in identically the same manner. When the circuit breaker is opened, its actuating force and the spring 61 acting upon the linkage serve to move the lever 64 downwardly and restore the linkage to its normal position as shown in Fig. 5.

In the operation of a number of generators, it becomes desirable to at times cut in certain generators when the power flowing through the distribution system exceeds a predetermined amount. It also becomes desirable to operate one or more of the generators only intermittently during peak loads so as to conserve the water available in the mill pond. In Fig. 6, I have shown a system having such characteristics and in which the generators are adapted to be loaded in accordance with the amount of power flowing in the distribution system.

In Fig. 6, the distribution system has been designated at A and the phases thereof by reference numerals 1, 2 and 3. The two generators therefor are indicated at 265 and 266 and are driven by prime movers 267 and 268, which in this form of the invention have been assumed to be water turbines. The generators are connected to generator lines 269 and 270 having phases 1, 2 and 3.

Each of the generators 265 and 266 has its own governor for controlling the operation of the respective prime movers 267 and 268, these governors being designated by the reference characters 271 and 272. The governors are constructed in accordance with the usual practice and may be the same as shown in Fig. 3. These governors are provided with a mechanism for taking on load which is the same as that shown in Fig. 3 and which includes a toggle linkage operated by the bell crank 151 through solenoid 70 as in the other form of the invention. In the governors illustrated in Fig. 6, the devices for releasing the limit lever 165 are slightly different. In the governor 272, a limit lever 165 is illustrated which extends completely across the governor frame or case. On the said case is formed a lug 273 which has pivoted to it an L-shaped lever 274. This lever carries a coil 275 which takes the place of the solenoid 172. The plunger 276 of this solenoid is pivoted to another lever 277 which in turn is pivoted to the lever 274. The extreme end of this lever has secured to it an adjusting screw 278 which is adapted to engage the end of the lever 165 and to operate in a manner similar to the adjusting screw 169 to control the operation of the governor and release the limit lever 165. The arm 274 is connected through a link 279 or some other suitable mechanical movement to a float 280 which travels proportionally to the change in height of the water in the mill pond.

The releasing mechanism for the limit lever 165 of governor 271 consists of an arm 280a pivoted intermediate its length to a bracket 281. This lever is pivoted to the plunger 282 of a solenoid 283, which is attached to a bracket 284 secured to the frame 49 of said governor. The lever 280a is provided with an adjusting screw 285 which is adapted to engage the end of the limit lever 165 in identically the same manner as the adjusting screw 278. Lever 280a is urged to move in a direction to cause the adjusting screw 285 to engage lever 165 by means of a spring 286 and the movement thereof is limited through another adjusting screw 287 carried by the bracket 281.

For operating the loading solenoid 70 of governor 271, a relay 288 is employed. This relay comprises a coil 289, a normally closed switch 290 and a dash pot 291. This relay 288 functions to permit of rapid opening of switch 290 and times the return movement of said return relay and the closing of said switch. The switch 290 is connected through a conductor 292 with the phase 3 of the generator line 269 and through another conductor 293 with the solenoid 70. The other terminal of this solenoid is connected through a conductor 294 with phase 2 of the generator line 269. Coil 289 of relay 288 is connected through a conductor 295 with phase 3 of generator line 269 and is further connected through another conductor 296 with phase 3 of the distribution line A. Another conductor 297 connects phase 2 of both the distribution line and the generator line together. In normal operation, current flows through the coil 289 of relay 288 from the distribution system when the generator is not running. When, however, the voltage of the generator becomes in phase with that of the distribution line, relay 288 becomes deenergized and the switch 290 closes. However, the closing of this switch is timed from the dash pot 291 so that the final closing of said switch does not occur until after the circuit breaker 298 has been closed. When this occurs, a circuit is established through the solenoid 70, which operates bell crank 151 actuating the loading device and causing the generator 265 to take on load.

In the device for operating solenoid 70 of governor 272, a relay 300 is employed. This relay includes a coil 301, a normally open switch 302 and a dash pot 303. Dash pot 303 functions in a manner to time the closing of the switch 302 and at the same time permits of rapidly opening said switch. The coil 301 is connected through a conductor 304 with phase 1 of the generator line 270 and is further connected through a conductor 305 with phase 3 of distribution line A. The switch 302 is connected through a conductor 306 with phase 3 of generator line 270 and through another conductor 307 with solenoid 70. The other terminal of solenoid 70 is connected through a conductor 308 with phase 2 of the generator line 270. Phases 2 of the generator line 270 and distribution line A are connected together through a conductor 309 having a resistance 310 therein. The relay 300 is designed to operate on a voltage equal to that of the generator plus that of the line voltage. Before circuit breaker 299 is closed, the resistance 310 shunting the circuit breaker connecting phase 2 of the distribution line and generator line, prevents the operation of relay 300. As soon as the circuit breaker closes, resistance 310 is then shunted out by the circuit breaker and the normally operating voltage applied to the coil 301. This causes the relay 300 to function against the actuation of the timing device 303. After the lapse of a certain length of time switch 302 is closed energizing solenoid 70 and operating the load pickup device.

For procuring the release of the limit lever 165 of both governors 271 and 272, a power operated relay indicated at 311 is employed. This relay comprises a current coil 312 and a potential coil 313 which operate a moving arm 314 adapted to contact with either of two fixed contacts 315 and 316. In conjunction with this relay, two other relays 317 and 318 are employed. Relay 317 comprises a coil 319, a normally closed switch 320, and two normally open switches 321 and 721. Relay 318 comprises a coil 322 and a normally closed switch 324.

For energizing the various switches and relays above referred to, a control line 325 is employed having two busses 327 and 328. A switch 329 operates to connect the control line 325 to any suitable source of electrical energy. The various parts are connected as follows: Current coil 312 of relay 311 is connected to two conductors 330 and 331 with a current transformer 332 mounted in phase 3 of the distribution line A. The potential coil 313 of this relay is connected to two conductors 333 and 334 with phases 2 and 3 of said distribution line. When the power reaches a predetermined minimum, arm 314 is in contact with the fixed contact 315. When, however, the power reaches a predetermined maximum, arm 314 is brought into contact with contact 316. It is to be understood that these contacts may be adjusted so that the minimum and maximum may be regulated to meet with the requirements. The arm 314 of relay 311 is connected through a conductor 335 with bus 327 of the line 325. The fixed contact 315 is connected through a conductor 336 with the coil 322 of relay 318 which in turn is connected through a conductor 346 with the other bus 328 of the control line 325. The contact 316 is connected through a conductor 337 with switch 324, which in turn is connected through a conductor 338 with coil 319 of relay 317. This coil is further connected through a conductor 339 with conductor 346 which as previously described leads to the bus 328 of line 325. Switches 320 and 321 are connected together and to the bus 327 through a conductor 340. Switch 321 is further connected through a conductor 341 with switch 721. This switch is connected to conductor 337 through conductor 322. Switch 320 is connected through a conductor 342 with solenoid 275 whose other terminal is connected through a conductor 343 with bus 328 of line 325.

In the operation of the relay 311, the following circuits are closed. In normal operation where the amount of power flowing through the distribution line A is below the prescribed minimum at which the contact 315 is closed, arm 314 is in engagement therewith. Under such circumstances when the switch 329 is closed, current would immediately flow through conductor 335, arm 314, contact 315, conductor 336, coil 318, conductor 346 and back to the bus 328 of the generator line 325. This would open the normally closed switch 324 and deprive the relay 317 of energy. Such condition continues until an amount of power flows in the distribution system to move arm 314. When this occurs, arm 314 moves out of engagement with contact 315. This immediately deenergizes the coil 322 of relay 318 which causes switch 324 to close. As the power in the distribution line A continues to increase, arm 314 moves toward contact 316 and into engagement therewith. A new circuit is then established. Current flows from bus 327 through conductors 335, arm 314, contact 316, conductor 337 through switch 324 which has been previously closed, through conductor 338, coil 319, and conductors 339 and 346 back to the bus 328 of the control line 325. This energizes relay 317 opening switch 320 and closing switches 321 and 721. In the normal operation of the device, as soon as switch 329 is closed, a circuit is established through conductors 340, normally closed switch 320, conductor 342, solenoid 275 and conductor 343 back to the bus 328. This draws the arm 277 downwardly and into the solenoid 275 against a compression spring 347. Such movement of lever 277 brings the adjusting screw 278 into engagement with the limit lever 165 limiting the ultimate movement thereof and the consequential maximum load which the governor may impose upon the generator. Energizing of relay 317 opens switch 320 which breaks the circuit through solenoid 275. Thereupon spring 347 raises lever 277 and releases the adjusting screw 278 to free the limit lever 165. At the same time actuation of solenoid 317 closes switches 321 and 721 which provides a maintaining circuit for maintaining relay coil 319 energized. These switches are in parallel with the switch formed between the arms 314 and 316 and when the power commences to decrease in the distribution line A, said switches maintain relay 317 actuated. When the arm 314 again reaches the contact 315, current is again re-established through coil 322 and the switch 324 opened. This deenergizes relay 317 bringing the parts back to normal position.

For operating the solenoid 283, a time controlled switch mechanism 348 is employed. This mechanism comprises a clockwork 349 or other suitable timing device adapted to close a switch 350 at any desired time of day. In conjunction therewith, a relay 351 is employed which comprises a coil 352, a normally open switch 353 and a normally closed switch 354. This relay also comprises a timing device 355, which times both the opening and closing of both the switches 353 and 354. The switch 351 may be of any suitable type and operates so that switching does not occur until the plunger of the switch reaches its two extreme positions. In this manner, double timing is procured so that a greater length of time is had between the opening and the closing of the switches. These various parts are connected together as follows:

Solenoid 283 is connected through a conductor 356 with bus 328 of the control line 325. The other side of this solenoid is connected through a conductor 357 with switch 353 and also through a conductor 358 with switch 350. Also switches 350 and 353 are connected through conductors 359 and 360 with the bus 327 of the control line 325. The switch 354 of relay 351 is connected through a conductor 361 with conductor 337 leading from contact 316 of the relay 311. This switch is further connected through a conductor 362 with coil 352 which in turn is connected through a conductor 363 with bus 328. Switch 354, being a normally closed switch, completes a circuit through coil 352 as soon as contact 316 is engaged by the arm 314. When this occurs, current flows from bus 327 through conductor 335, arm 314, contact 316, conductor 337, conductor 361, switch 354, conductor 362, coil 352, conductor 363, and back to bus 328. This energizes relay 351 opening switch 354 and closing switch 353 after a lapse of a predetermined length of time, controlled by the dash pot or other timing device 355. Closure of switch 353 closes another circuit. Commencing with bus 327, current flows through conductor 359, switch 353, coil 283, conductor 356 and back to bus 328. A normally operating spring 286 holds adjusting screw 285 into engagement with the limit lever 165. Energization of solenoid 283 causes the lever 280 to be swung in opposition to the spring and the limit lever to be freed from said adjusting screw. The generator 265 is then caused to assume maximum load. It so continues to operate until the dash pot 355 permits relay 351 to reach normal position. As soon as switch 354 is opened, coil 352 is deenergized and the relay commences to return to normal in opposition to the dash pot 355. When the switch 354 is closed and the switch 353 opened, the reverse procedure takes place and the intermittent feeding of power by the generator 265 to the distribution line is procured. If desired, the generator 265 can be caused to deliver power at any predetermined time of day independently of the relay 311. This is accomplished by the time controlled switch mechanism 348 which closes switch 350 and completes a circuit through solenoid 283 energizing said solenoid and maintaining it energized until the clock mechanism 349 opens switch 350.

In Fig. 6, a system was shown in which the generator was caused to change loading between predetermined maximum and minimum limits in accordance with maximum and minimum flow of power from the distribution system. If desired, a gradual adjustment of the governor may be had to procure proportional assumption of load by the generator to the power flowing in the distribution system. In Figs. 7 to 12, one such system is illustrated. In this system the generator distribution line and governor are the same as in Fig. 6 and the same reference characters have been used to designate the similar various parts thereof. The load pickup device of the governor is, however, adjusted in a slightly different manner as will now be described.

To the exterior of the case or frame 49 of governor 272, is attached a bracket 364. This bracket has pivoted to it, a swinging arm 365 which extends inwardly into the frame 49 and engages the cap 47 attached to speeder rod 108. This arm is held in engagement with said cap 47 through a tension coil spring 367 which is attached at one end to said arm and at its other end to another arm 368 also pivoted to bracket 364. A reversible motor 369, mounted on said bracket operates a screw 370 by means of which the arm 368 may be raised and lowered to vary the spring tension of the spring 367. This construction is shown in detail in Figs. 8, 9 and 10. The screw 370 is journaled in a bearing 371 formed on bracket 364 which bearing is of such a construction as to preclude longitudinal movement of said screw. At two localities on the screw 370 are formed nuts 372 and 373 which are secured thereto through pins 374 and which serve as stops for limiting the movement of the arm 368. The screw 370 is threaded intermediate the stops 372 and 373, which portion has screwed upon it, a nut 375 shown in detail in Fig. 9.

The nut 375 is provided with an annular groove 376 and has a split sleeve 377 surrounding the same, which sleeve is constructed of spring material and frictionally engages the periphery of said nut to form a clutch in conjunction therewith. Nut 375, together with sleeve 377, is freely received in a suitable opening in arm 368 and is held in place therein through a set screw, not shown, which is threaded in the arm 368 and which is disposed within a space 378 formed between the ends of the split sleeve 377. This set screw holds the nut 375 from rotation so that rotation of the screw 370 raises and lowers arm 368 to vary the spring tension in the spring 367.

The motor 369 carries a worm 380 which meshes with a worm wheel 379 fast on the screw 370. As the motor 369 operates in opposite directions, screw 370 is turned one way or the other to raise or lower the arm 368. The two stops 372 and 373 are each provided with a pin 381 which is adapted to engage corresponding pins 382 on the nut 375 when the screw is screwed so that these stops reach their extreme positions. When this occurs, the pins 381 rotate the nut 375 through engagement with pins 372 thereby preventing the further advance of the lever. When this occurs, the nut slips in the sleeve 377 and so continues until the motor 369 is reversed. In this manner, injury to the parts is prevented and the mechanism is at all times in condition to function and definite limits of adjustment of the arm, 368 can be established.

During the synchronizing of the generator 266, it becomes desirable to free the governor from the action of spring 367 so that the matching of speeds may take place in the customary manner. For this purpose a solenoid 382 is employed whose plunger 383 is pivoted to a lever 384. Lever 384 is pivoted to bracket 364 and is further pivotally connected to a rod 385 which passes through the arm 365 and is formed with a head 386 at the end thereof. When solenoid 382 is energized, lever 384 is swung upwardly and a head 386 of rod 385 caused to depress arm 365 disengaging the same from cap 47. The governor may then be used for synchronizing purposes as is well known in the art. Solenoid 382 may be energized through the relay 95 shown in Fig. 1 by the addition of an appropriate switch thereto and an operating circuit therefor. The precise manner of operating the same, forming no particular feature of the invention has not been illustrated in this drawing.

Adjustment of the governor to cause the generator to assume a load proportional to the power flowing in the distribution line is procured through the motor 369 and spring 367. This motor is controlled through a power responsive device 387, and two current responsive devices 388 and 389. These devices will now be described in detail.

The power responsive device 387 is of the nature of an indicating watt meter and since such construction is well known in the art, the details thereof have not been illustrated. This device is formed with a pointer or hand 390 which is adapted to be carried by a shaft 396 and oscillated between certain limits in the customary manner. This device further includes the usual current coils and potential coils so that the same may be operated by three phase power. For operating the power responsive device 387, two current transformers 391 are employed which are connected to the phases 1 and 3 of the distribution line A. These transformers are connected through suitable conductors 392 with the current coils of said device. In addition, a 3 phase potential transformer 393 is employed which is connected through conductors 394 with the distribution line and through conductors 395 with the potential coils of the device 387. When current flows in the distribution line A, the hand 390 of this device moves a distance varying with the current flowing.

The current responsive device 388 may be in the nature of an ammeter of ordinary construction and is provided with a shaft 397 which carries a hand 398 similar to the hand 390. An extension on shaft 397, indicated at 399 carries a contact finger 400, which is adapted to contact with either of two spaced contacts 401 and 402 carried by the hand 390 and insulated therefrom. When the hand 390 moves in a clockwise direction as viewed in the figure, contact 401 engages contact 400. When the hand 398 moves in a clockwise direction, contact 400 is brought into engagement with contact 402 and the reverse is true for both of these hands.

The current responsive device 389 is identical with the current responsive device 388 and is likewise constructed with a hand 406 having a contact finger 404 thereon the same as the contact finger 400. This contact finger is adapted to engage either of two contacts 405 or 406 spaced and insulated from one another and attached to an arm 407 carried by the limit lever shaft 166 of the governor proper. This shaft, as previously described, supports the limit lever 165 through an eccentric cam 409. The shaft 166 also has attached to it, arm 167 which as previously described was connected through the operating rod 170 moved by a structure of the governor movable in accordance with the gate opening. As the gate opens, the arm 167 is raised causing the arm 407 to move clockwise and the contact 406 to become engaged with the contact 404. In like manner closing of the gate causes engagement with the other contact 405.

The contacts controlled through the power responsive device 387 and the current responsive device 388 control circuits which operate two relays 412 and 413. These relays receive power from a suitable energizing line 449 comprising leads 414—415 which may be connected to a source of power through a switch 416. The relay 412 comprises a coil 417 and a normally open switch 418, the relay 413 comprising a coil 419 and a normally open switch 420. In addition to these relays two limit switches 421 and 422 are employed which are normally closed and which are adapted to be opened by a finger 423 movable between these switches through a screw 424. A nut 425 on the finger 423 is advanced through the screw 424 by rotation thereof. Screw 424 is driven in either direction by a reversible motor 426 whose shaft is connected to the screw 424 through suitable gearing or other driving mechanism not shown in the drawings. The finger 423 carries a sliding contact 427 which is adapted to engage a variable resistance 428 and to vary the resistance thereof as the nut 425 is moved along the screw 424. A hand operated variable resistance 429 is also employed and a manually controlled double throw switch 430 used to disconnect the operating mechanism from the device to be operated, and to switch from manual operation to automatic operation.

The various parts are connected together as follows: The power responsive device 387 is connected to the line A as previously explained. Between the two current responsive devices 388 and 389 is a line 431—432. The side 432 of this line is directly connected to one of the terminals of the current responsive device 388 and to one of the terminals of the current responsive device 389. The other side 431 of this line is connected to the current responsive device 389 and indirectly connected to the current responsive device 388 through the resistance 428. This side is further connected to the lead 414 of the control line 449. The other lead 415 of the control line is directly connected through a conductor 433 with the contact 427 on finger 423. The other terminal of the current responsive device 388 is connected through a conductor 434 with switch 430 which is connected through a conductor 434, with the variable resistance 429. This resistance is connected through a conductor 436 with energizing line 449, which is employed for energizing the various current responsive devices. Resistance 428 is also connected to the switch 430.

The two relays 412 and 413 are connected as follows: A conductor 437 leads from the contact finger 401 to the coil 417 of relay 412. This coil is further connected through a conductor 438 with the lead 415. The coil 419 is similarly connected through a conductor 439 with contact finger 402 and through a conductor 440 with lead 415. Contact finger 400 is connected through a conductor 441 with the two sides 431 and 414 of the lines previously referred to. The switch 418 of relay 412 is connected through a conductor 442 with lead 414 and through the conductor 443 with limit switch 422. This limit switch is connected through a conductor 444 with one of the terminals of motor 426 whose common terminal is connected through a conductor 445 with the lead 415. Switch 420 is connected through conductor 446 with lead 414 and is further connected through a conductor 447 with the limit switch 421. Limit switch 421 is connected through a conductor 448 with the other terminal of motor 426.

The contacts on the current responsive device 389 are connected as follows: The contact finger 404 is connected through a conductor 451 with a potential transformer 452 energized from the generator line B. This transformer is further connected through a conductor 453 with the common terminal of the motor 367. The other two terminals of the motor 469 are connected through conductors 454 and 455 with the fingers 406 and 405 respectively.

The operation of the invention is as follows: When it is desired to procure automatic control, switch 430 is first thrown in the direction connecting resistance 428 to the conductor 434 which at the same time disconnects the resistance 429 from said conductor. When power in the line A is changing, the hand 390 of the power responsive device 387 moves in one direction or the other, depending on whether the power is increasing or decreasing. Assuming that the flow of power in the line A is increasing, hand 390 will be assumed to travel in a clockwise direction. This will cause contact finger 401 to engage contact 400 and will complete the following circuit: Starting with lead 415, current flows through conductor 438, coil 417 of relay 412, conductor 437, contact finger 401, contact 400, conductor 441 and back to the other side 414 of the line, furnishing current for this device. This operates relay 412 for closing switch 418. A new circuit is then established. Commencing with the lead 414 of line 449, current flows through conductor 442, switch 418, conductor 443, limit switch 422, conductor 444, motor 426 and conductor 445 back to the line. This energizes motor 426 and causes the same to rotate in a direction to move the finger 423 toward the right. When switch 430 is closed, the following circuit is established. Commencing with the lead 415 of line 449, current flows through conductor 433, contact 427, resistance 428, switch 430, conductor 434, current responsive device 388, lead 432 of control line 450, current responsive device 389, lead 431 of said control line and back to the lead 414. Movement of the finger 423 shunts out a portion of the resistance 428 which increases the current flowing in the current responsive device 388. This causes a movement of the shaft 397 of said device in a clockwise direction, until the finger 400 has moved away from the contact 401 and the circuit through relay 417 open. When this occurs, motor 426 is deenergized and the nut 425 and finger 423 remain in their last position. The increase of current through the current responsive device 388 similarly causes an increased flow of current in the control line 450 and the current responsive device 389. This causes the contact 404 to move in a clockwise direction as viewed in Fig. 11 and to close the following circuit. Commencing with transformer 452 a circuit is completed through conductor 451, contact finger 404, contact 406, conductor 454, motor 369 and conductor 453. Motor 369 is now energized and rotates to operate gearing 379 and 380 which rotates shaft 370 and swings the lever 368 upwardly. This increases the tension of spring 367 which complements the action of spring 61 and causes the opening of the gate for the prime mover 268 of generator 266. As the gate opens, arm 167 is moved by the gate controlling mechanism and shaft 166 rotated. Such movement continues until the arm 407 carrying fingers 405 and 406 is moved out of engagement with contact 404. The circuit through motor 369 is then broken and the parts come to rest. The governor C is at such time taking fluid proportional to the power flowing in the distribution line A. The generator then continues to so operate until a change of flow of power in the distribution line A occurs and the hand 390 is moved in one direction or the other to again cause a resetting of the governor as previously explained. Although the motor 369 has been shown as directly connected through the contact fingers 404, 405 and 406 it can readily be comprehended that this motor may be connected through an auxiliary relay if desired. In the event that excessive power flows in the line A or in the event that an amount of power flows below a predetermined minimum, finger 423 engages either of the fingers 421 or 422 as the case may be and opens the particular circuit through motor 426 stopping the movement of said finger in such direction. The device can then only be further operated by a reversal of power sufficient to again close this limit switch or in the event that the device is manually controlled through switch 430.

It can readily be comprehended that any type of current responsive device may be used as for example temperature operated devices or the like and a compensating motor mechanism may be used for moving the contacts in the same manner as an indicating instrument.

In the system shown in Fig. 7, the governor is caused to admit additional fluid to the prime mover in accordance with the changes in power flowing in the distribution line. In the form of the invention shown in Fig. 13, a similar system is illustrated in which the generator is caused to deliver a predetermined amount of power proportionate to the power flowing in the distribution line. In this system the current responsive device 389 and the contacts cooperating therewith are associated with another power responsive device 455 identical with the power responsive device 387. This device includes a shaft 456 which carries the arm 407 and the fingers 405 and 406. The motor 369 is somewhat differently connected to control the operation of the governor in this form of the invention. This motor is attached to a bracket 457 which is secured to the frame or case 49 of the governor C. This motor has attached to the armature shaft thereof a spur pinion 458 which meshes with a spur gear 459. The gear 459 is threaded and screws upon a screw 460 slidably mounted in the bracket 457. The lower end of the screw 460 is provided with a slot 461 in which a pin 462 on the limit lever 165 is movable. As the screw 460 is raised and lowered, this structure operates upon the limit lever in much the same manner as the device described in Figs. 3 or 6, excepting that a gradual limiting of the movement of this lever is had instead of a movement between fixed limits as disclosed in said figures. Gear 459 is preferably frictionally driven from the motor 369 so as to prevent injury to the parts in the event that the threads of the screw of gear 459 reach either end of the screw 460 and in the event any of the parts become locked and so prevent rotation of pinion 458. This construction is shown in detail in Fig. 14. Fixed to the motor shaft 471 is a hub 472 which carries two or more spring fingers 473 which are adapted to frictionally engage a hub 474 attached to the pinion 458. This pinion and its hub travels freely upon the shaft 451 and are held in place by the fingers 473 and driven therethrough. When locking of the gear 458 occurs through any reason whatsoever, the shaft 473 slips and no harm is done.

In conjunction with the operation of the motor 369, two limit switches 463 and 464 are employed which are connected in the two conductors 454 and 455 and which operate in identically the same manner as limit switches 421 and 422. A finger 465 on the end of screw 460 operates these limit switches the same as the finger 423.

The power responsive device 455 is connected to the generator line B. A number of conductors 466 connect the current coil of this device to the current transformer 467 which in turn is connected to phases 1 and 3 of said generator line. Other conductors 468 connect the potential coil of this device to a transformer 469 which is connected to the generator line through conductor 470.

The operation of this system is almost the same as that shown in Fig. 7, excepting that the switch through contacts 405 and 406 does not open to shut off the motor until a predetermined amount of power flows in the generator line. When this occurs, the hand 407 on the watt meter shaft 456 is so moved that the contacts 405 and 406 are disengaged from contact 404 and the motor 369 stopped.

In the form of the invention shown in Fig. 13, identically the same load pick-up device as illustrated in Fig. 6 may be employed.

Where ordinary ammeters and watt meters are utilized as the responsive devices 387, 388, 389 and 455, the usual pointers or hands employed therewith may be used and appropriately calibrated scales employed if necessary so that the said devices will indicate the power flowing in the generator line and in the distribution system line.

In the event that the power flowing in the distribution line A fluctuates fairly rapidly so as to produce a pulsating effect, it would be undesirable to repeatedly operate the governor to cause the change of delivery of power by the generator. Toward this end, the two relays 412 and 413 are provided with dash pots or other timing devices 475 and 476 which are adapted to retard the closing of the switches 418 and 420.

Figure 16:
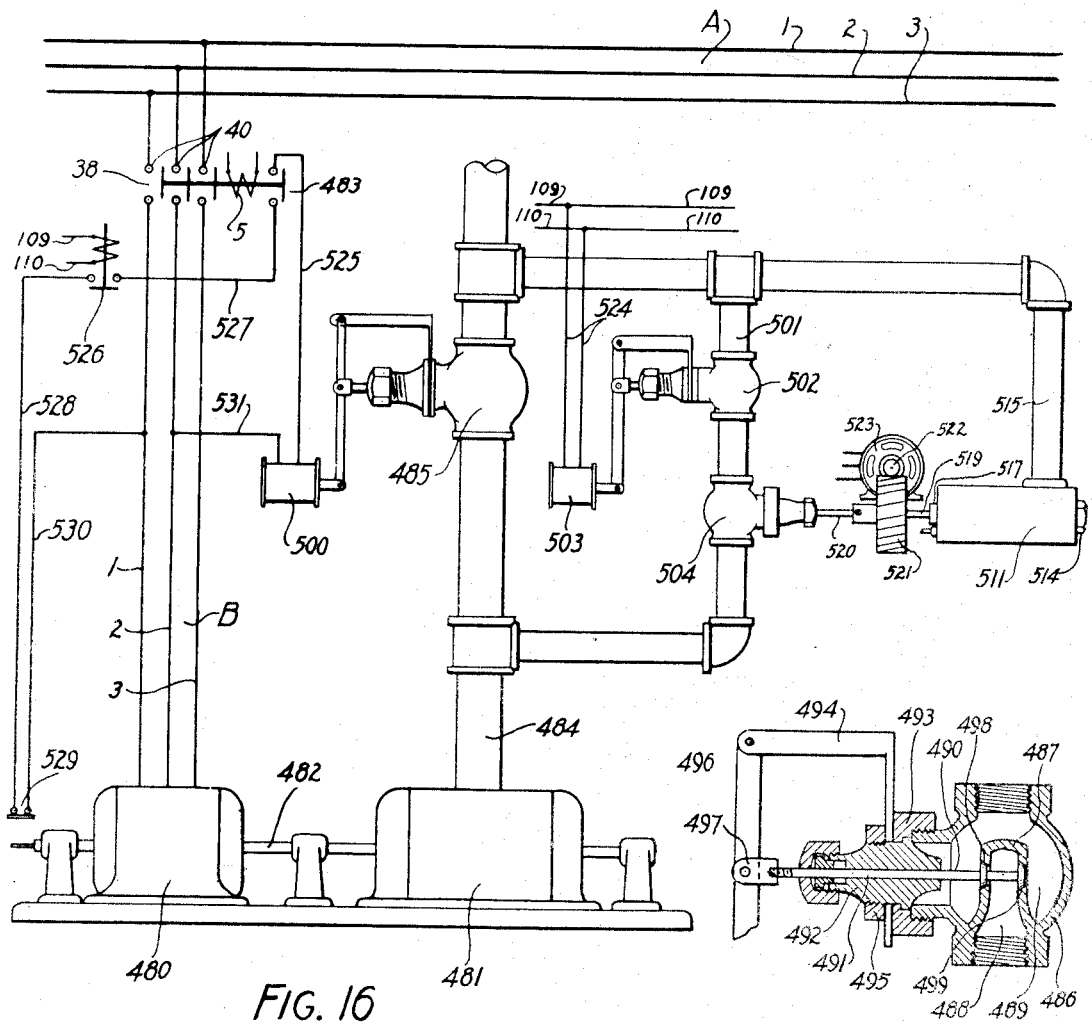
Fig. 16 is a diagrammatic view illustrating still another embodiment of my invention.
Figure 17:
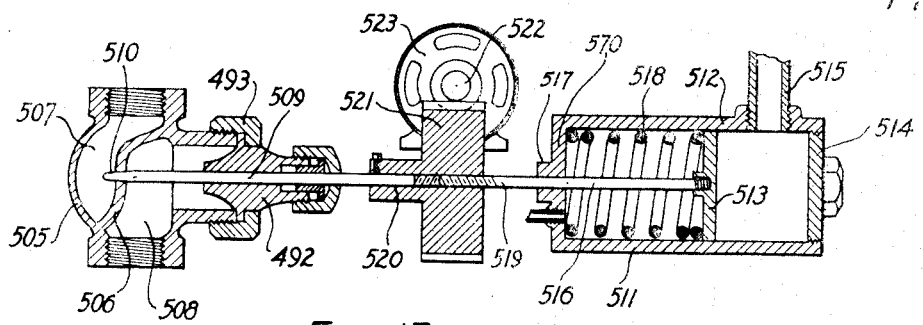
Fig. 17 is a vertical sectional view of one of the valves in the operating mechanism therefor.

In Figs. 16, 17 and 18 I have shown a form of my invention in which the control and operation of the system may be had through means other than the centrifugal governor illustrated in the previous drawings.

In Fig. 16, a generator 480 has been shown driven from a water turbine 481, through a shaft 482. The generator 480 is connected to the generator line B, whose phases are indicated at 1, 2, and 3. This generator line is adapted to feed into the distribution line A, the phases of which are designated at 1, 2 and 3. The circuit breaker is indicated at 38 and consists of switches 40, its operating coil 5 and another switch 483. The method of operating the circuit breaker 38 through its coil 5 can be identical with that shown in Fig. 1 and has hence not been illustrated in this drawing or described.

The pipe for delivering water to the turbine 481 is indicated at 484 and has connected in it a valve 485 shown in detail in Fig. 18. This valve comprises a body 486 provided with a partition 487 therein dividing said body into two compartments 488 and 489 communicating with the two portions of the pipe 484 with which the valve is connected. A valve stem 490 is slidably mounted in a guideway 491 formed in a head 492 secured to the body 486 through a cap 493. A bracket 494 is secured to the head 492 through a nut 495 and supports an arm 496 which is pivoted thereto. Arm 496 is pivotally connected through a connector 497 with the valve stem 490 and serves to open and close valve 502 as the said arm is swung about its pivot on bracket 494. The valve stem 490 is provided with two valve heads 498 and 499 adapted to seat in corresponding seats in the partition 487 so as to form a balanced valve operating to cut off or control the fluid through the pipe 484 and into the turbine 481. The valve 485 is operated through a solenoid 500 which serves the same purpose as the solenoid 71 in the form of the invention shown in Fig. 1 and Fig. 2.

By-passing the valve 485 is a branch pipe 501 which has in it a valve pipe 502 similar to the valve 485 which is operated through a solenoid 503 in identically the same manner as the valve 485. This valve has the same function as the valve operated by solenoid 106 in Fig. 1 and the solenoid 503 serves the same function as said solenoid 106. This branch pipe also contains another valve 504 which is shown in detail in Fig. 17. Valve 504 comprises a body 505 which is provided with a partition 506 having an opening therein and dividing the valve into two compartments 507 and 508 communicating with the two portions of pipe 501 connected to said valve. The said valve is further constructed with a valve stem 509 similar to the valve stem 490 and guided and supported in identically the same manner. This valve stem is provided with a needle point 510 whereby the accurate flow of fluid through the valve 504 may be procured.

Operating in conjunction with the valve 504 is a pressure responsive device 511 which comprises a cylinder 512 having a piston 513 reciprocable therein. The end of the cylinder 512 is closed through a cap 514. A pipe 515 is connected to the cylinder 512 and also to the source of fluid which may be through the pipe 501 previously referred to and illustrated in Fig. 16. Piston 513 has connected to it a piston rod 516 which operates through a guide 517 in the end wall 570 of this cylinder 512. Between the end wall 570 of this cylinder and the piston 513 is a compression coil spring 518 which encircles the piston rod 516 and which urges the said piston 513 toward the cap 514. The extreme end of the piston rod 516 is threaded as designated at 519, which threaded end is screwed into the bore 520 of an elongated worm 521. The valve stem 509 and the piston rod 516 are disposed in alignment and the said valve stem is rigidly secured to the gear 521 within one end of the bore 520 thereof. The worm wheel 521 may be rotated through a worm 522 which is driven through a motor 523. Motor 523 has the same function as the motor 63 of the form of the invention shown in Fig. 1 and serves to procure an adjustment between the needle valve 510 and its seat in conjunction with the operation of the piston 513.

The solenoid 503 is connected through a suitable circuit 524 which is energized and controlled in exactly the same manner as the circuit 15—16 of the form of the invention shown in Fig. 1. The solenoid 500 is connected through a conductor 525 with switch 483, which in turn is connected with a conductor 527 to a relay 526 corresponding with relay 30. The relay 526 is connected with a centrifugally operated switch 529 controlled through the shaft 482. This switch is connected through a conductor 530 with the phase 1 of the distribution line B. Phase 2 of this distribution line is connected through a conductor 531 with the solenoid 500.

The operation of this form of the invention is as follows: Solenoid 503 which corresponds to solenoid 106 is first energized by closure of circuit 524 which corresponds with the closing of switch 111. Valve 502 is then opened and water flows through the pipe 501 and through the valve 504. The water is then conducted through pipe 484 and into the turbine 481 energizing the same. The generator is then brought up to a speed somewhat nearer synchronous speed. Synchronization of the generator is accomplished through a synchronizing device shown in Fig. 1 which rotates in one direction or the other depending upon whether or not the generator is above or below synchronous speed. During its rotation, the worm 522 is rotated which causes the piston rod 516 to be moved. This moves the needle point 510 into or out of the valve causing an increase or decrease in the amount of water delivered to the generator. In this manner, speed matching is procured and the generator brought up to synchronous speed. At synchronism, the synchronizing device actuates coil 5 and closes the circuit breaker connecting the generator to the distribution system. Upon closure of the circuit breaker, switch 483 is closed, which completes the circuit through solenoid 500. This opens valve 485 letting in additional water to operate the turbine 481. Solenoid 500 operates to place load upon the generator and the amount of this load is preferably determined in advance though if desired the adjustment can be had between the lever 496 and the valve stem 490.

The amount of water delivered to the turbine 481 is controlled through the amount of water available at the source or through the pressure of the water in the pipe 501. Cylinder 512 comes into play in this respect. When the head or pressure is low, the piston 513 moves toward the right through the actuation of spring 518 and the valve 504 is further opened. When the head of the water is high, less water is needed to run the turbine and the pressure of the water acts upon piston 513 to throttle down the valve 504 and cause the right amount of water to enter the turbine. In this manner, the control of the generator is had independently of the pressure of the system or the head of the water used for controlling the same. At the same time, the generator can be maintained at a constant speed independent of the pressure of the water available.

Although I have described the form of the invention shown in Figs. 16, 17 and 18 as applicable to water, it can readily be comprehended that the same can be also used for steam plants.

Changes in the specific form of my invention, as herein disclosed, may be made within the scope of what is claimed without departing from the spirit of my invention.

Having described my invention what I claim as new and desire to protect by Letters Patent is:

1. In combination with a distribution system and a generator for supplying electrical energy thereto, a circuit breaker for connecting said generator to the distribution system, a prime mover for said generator, a governor for said prime mover including a speed control member for controlling the speed of said prime mover, an adjusting member movable between fixed limits for adjusting the operation of said speed control member to vary the load taken by said generator, and fluid operated means for moving said adjusting member from one limit to the other.

2. In combination with a distribution system and a generator for supplying electrical energy thereto, a circuit breaker for connecting said generator to the distribution system, a prime mover for said generator, a governor for said prime mover including a speed control member for controlling the speed of said prime mover, an adjusting member movable between fixed limits for adjusting the operation of said speed control member to vary the load taken by said generator, fluid operated means for moving said adjusting member from one limit to the other, and a valve operated by the circuit breaker for actuating said fluid operated means.

3. In combination with a distribution system, and a generator for supplying electrical energy thereto, a circuit breaker for connecting said generator to the distribution system, a prime mover for said generator, a governor for said prime mover including a speed control member for controlling the speed of said prime mover, an adjusting member movable between fixed limits for adjusting the operation of said speed control member to vary the load taken by said generator, and a linkage connected to said adjusting member and operated by the circuit breaker for moving said adjusting member from one limit to the other.

4. In combination with a distribution system and a generator for supplying electrical energy thereto, a prime mover for said generator, means for controlling the admission of driving medium to said prime mover, means for connecting the generator to the system at a predetermined relative electrical condition of the generator and system, first means for adjusting said controlling means for bringing said prime mover and generator to said predetermined relative electrical condition preliminary to connection to the system, and second means for adjusting said controlling means independently of its adjustment by said first means and including actuating devices responsive to the load demand of said system.

5. In combination with a distribution system and a generator for supplying electrical energy thereto, a prime mover for said generator, means for controlling the admission of driving medium to said prime mover, means for connecting the generator to the system at a predetermined relative electrical condition of the generator and system, first means for adjusting said controlling means for bringing said prime mover and generator to said predetermined relative electrical condition preliminary to connection to the system, second means for actuating said controlling means independently of the position of said first means and including an adjustable member and means responsive to the load demand of said system for adjusting said member, and means coordinated with said connecting means for superseding said first means and bringing said controlling means under the influence of said adjustable member.

6. A generator-load controlling apparatus for a generator and prime mover plant connected to a distributing line which is connected to a further source of current, comprising a device energized in accordance with the intensity of the current flowing from said further source, and means controlled by said device for controlling said prime mover to cause said generator to deliver more or less current to the line in proportion to the current flowing from said source.

7. A generator-load controlling apparatus, comprising a source of electric energy, a distributing line connected to said source, a generator and prime mover plant, means for starting said plant and connecting it to the line, a device energized in accordance with the intensity of the current flowing from said source, and means controlled by said device for operating said starting and connecting means so that said generator delivers current to said line for preventing delivery of electrical energy by said source above a predetermined maximum.

8. A generator-load controlling apparatus, comprising a source of electrical energy, a distributing line connected to said source, a generator and prime mover plant, means for controlling said plant, a device energized in accordance with the intensity of current flowing in said line, and means controlled by said device for determining the current delivered by said source to said line at low intensities of current in said line, and effective at a predetermined intensity in said line for operating said controlling means to cause said generator also to deliver current to said line.

9. A generator-load controlling apparatus, comprising a generator and a distributing line connected thereto, a first device responsive to the current flowing in said line, a second device for controlling said generator, a control circuit, means associated with said first device for controlling the energization of said control circuit, means energized by said control circuit for actuating said second device, and further means for regulating the rate of energization of said control circuit by said controlling means.

10. A load proportioning apparatus for an electric generator and prime mover plant connected to a distributing line, comprising first metering means energized in accordance with current flowing in said system, second metering means energized in accordance with the current supplied from said generator, first means cooperating with said second metering means for controlling the current supplied from said generator, second means cooperating with said first metering means for controlling the proportion of current in the line which shall be supplied by said generator, and means controlled by said second cooperating means for coordinating said first and second cooperating means.

11. A load proportioning apparatus for an electric generator and prime mover plant connected to a distributing line, comprising metering means energized in accordance with the current flowing in said line, means for varying the power output of said prime mover plant, supervising means controlled by said metering means for actuating said varying means, and devices actuated in accordance with the operation of said generator and prime mover plant and coordinately controlled by said supervising means for maintaining the proportionality between the current supplied by said generator and the total current flowing in said distributing system.

12. A load controlling apparatus for an electric generator and prime mover plant connected to a distributing line, comprising metering means responsive to the current flowing in said line, first means selected by said current responsive means and responsive to the supply of driving medium for controlling the admission of driving medium to said prime mover plant at below a predetermined current value in said line, second means selected by said current responsive means for controlling the admission of driving medium to said prime mover plant at a current value in said line above said predetermined value and operating independently of the supply of driving medium, said second means including devices to restore the first means to controlling condition when said current drops below said predetermined value.

13. A load controlling apparatus for an electric generator and prime mover plant connected to a distribution line, comprising a first device responsive to the current flowing in the line, a second device responsive to the current flowing from the generator, means actuated by the devices conjointly for regulating the current output of the generator, and means actuated with said regulating means for varying the response of said second device to the generator current.

14. A load controlling apparatus for an electric generator and prime mover plant connected to a distribution line, comprising a first device responsive to the current flowing in the line, a second device responsive to the current flowing from the generator, means actuated by said devices for comparing the indications of said devices, means controlled by said comparing means for varying the response of one said device to one said current, and means for regulating the current output of the generator and connected for actuation with said response varying means.

15. A load controlling apparatus for an electric generator and prime mover plant connected to a distribution line, comprising means for comparing the currents flowing in the line and from the generator, means for regulating the current output of the generator, and means actuated by the comparing means in accordance with relative variation of the proportion of the current from the generator to the current in the line for actuating the regulating means for restoring said proportion.

16. A load controlling apparatus for an electric generator and prime mover plant connected to a distribution line, comprising a first metering device responsive to the current flowing in the line, a further metering device responsive to the current flowing from the generator, a circuit including a pair of current responsive devices and a rheostat connected in series, means selectively actuated by said first metering device and one said current responsive device for varying said rheostat, and means selectively actuated by said further metering device and the other said current responsive device for regulating the current output of the generator.

17. A load controlling apparatus for an electric generator and prime mover plant connected to a distribution line, comprising a first metering device responsive to the current flowing in the line, a further metering device responsive to the current flowing from the generator, a circuit including a pair of current responsive devices and a rheostat connected in series, and means selectively actuated by said further device and one said current responsive device for regulating the current output of the generator, said first metering device and the other said current responsive device being located remotely with respect to said further metering device and said one current responsive device, so that an indication is afforded of the current flowing through said current responsive devices and of the current flowing in the distribution line.

18. A load controlling apparatus for an electric generator and prime mover plant connected to a distribution line, comprising a metering device responsive to the current flowing from the generator, a second current responsive device and means for supplying current thereto and including a rheostat, contacts selectively closed when the response of one said device is greater or less than that of the other said device by predetermined amounts, and devices including circuits extending through said contacts for regulating the current output of the generator.

ERICK PEARSON.